US012659751B2

(12) United States Patent　　　　(10) Patent No.:　US 12,659,751 B2

Tatem et al.　　　　　　　　　　　　(45) Date of Patent:　　Jun. 16, 2026

(54) SYSTEMS AND METHODS FOR POLICY-BASED MULTI-PROFILE SUBSCRIBER IDENTIFICATION MODULE FOR INTERNET OF THINGS DEVICES AND OTHER USER EQUIPMENT

(71) Applicant: Verizon Patent and Licensing Inc., Basking Ridge, NJ (US)

(72) Inventors: Diana Tatem, Cape May, NJ (US); Danny Kyung Min Seo, Rochester Hills, MI (US); John Sangem, Whippany, NJ (US); Kala Narayanan, Piscataway, NJ (US); Akhil Shah, Lake Hiawatha, NJ (US); Taussif Khan, Martinsville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 338 days.

(21) Appl. No.: 18/425,979

(22) Filed: Jan. 29, 2024

(65) Prior Publication Data

US 2025/0247707 A1　　Jul. 31, 2025

(51) Int. Cl.
| | |
|---|---|
| *H04W 12/06* | (2021.01) |
| *H04W 8/18* | (2009.01) |
| *H04W 12/08* | (2021.01) |
| *H04W 12/12* | (2021.01) |
| *H04W 12/37* | (2021.01) |
| *H04W 12/72* | (2021.01) |

(52) U.S. Cl.
CPC ........... *H04W 12/72* (2021.01); *H04W 8/183* (2013.01); *H04W 12/37* (2021.01)

(58) Field of Classification Search
CPC ...... H04W 12/72; H04W 12/37; H04W 8/183
USPC ......................................................... 455/411
See application file for complete search history.

(56) References Cited

U.S. PATENT DOCUMENTS

| | | | |
|---|---|---|---|
| 2015/0296369 A1* | 10/2015 | Berionne .............. | H04W 8/183 455/418 |
| 2016/0014280 A1* | 1/2016 | Brunsman ........... | H04L 63/0272 455/418 |
| 2017/0048713 A1* | 2/2017 | Guday .................. | H04W 12/35 |

(Continued)

OTHER PUBLICATIONS

IP.com search History (Year: 2026).*

(Continued)

*Primary Examiner* — Moustapha Diaby

(57) ABSTRACT

A device, such as a Subscriber Identification Module ("SIM") device, may maintain a set of profiles that each include a respective set of authentication credentials for connecting to one or more wireless networks. The device may maintain a set of policies associating respective events with respective profiles of the set of profiles, may receive an indication of a particular event, and may identify, based on the set of policies, that the particular event is associated with a particular profile. The device may select the particular profile as an active profile, and may output a refresh command after selecting the particular profile as the active profile. The device may receive, based on outputting the refresh command, a request for the active profile, and may output, based on the request for the active profile, the set of authentication credentials associated with the selected particular profile.

20 Claims, 10 Drawing Sheets

(56) References Cited

U.S. PATENT DOCUMENTS

| | | | | |
|---|---|---|---|---|
| 2017/0318465 A1* | 11/2017 | Seo | ........................ | H04W 12/08 |
| 2018/0227921 A1* | 8/2018 | Liu | ................... | H04W 36/0072 |
| 2020/0367043 A1* | 11/2020 | Anand | .................. | H04W 12/40 |
| 2022/0022028 A1* | 1/2022 | Li | ........................... | H04W 4/50 |
| 2023/0171586 A1* | 6/2023 | Holmes | ................ | H04W 84/18 |
| | | | | 455/435.1 |
| 2024/0187840 A1* | 6/2024 | Kang | ................... | H04L 63/102 |
| 2025/0150803 A1* | 5/2025 | An | ........................... | H04W 8/06 |

OTHER PUBLICATIONS

Third Generation Partnership Project, "Technical Specification Group Core Network and Terminals; Technical Specification Group Core Network and Terminals; Universal Subscriber Identity Module (USIM) Application Toolkit (USAT) (Release 18)," 3GPP TS 31.111 V18.4.0 (Dec. 2023).

Third Generation Partnership Project, "Technical Specification Group Core Network and Terminals; Non-Access-Stratum (NAS) Functions Related to Mobile Station (MS) in Idle Mode (Release 18)," TS 23.122 V.18.5.0 (Dec. 2023).

Third Generation Partnership Project, "Technical Specification Group Services and System Aspects; (U)SIM Application Toolkit (USAT); Service description; Stage 1 (Release 17)," TS 22.038 V.17.0.0 (Mar. 2022).

European Telecommunications Standards Institute, "Smart Cards; Card Application Toolkit (CAT) (Release 9)," ETSI TS 102 223 V9.3.0 (Nov. 2011).

* cited by examiner

UE 101 moves from coverage area of network 301
to coverage area of network 303
(*e.g.*, connectivity to network 301 lost)

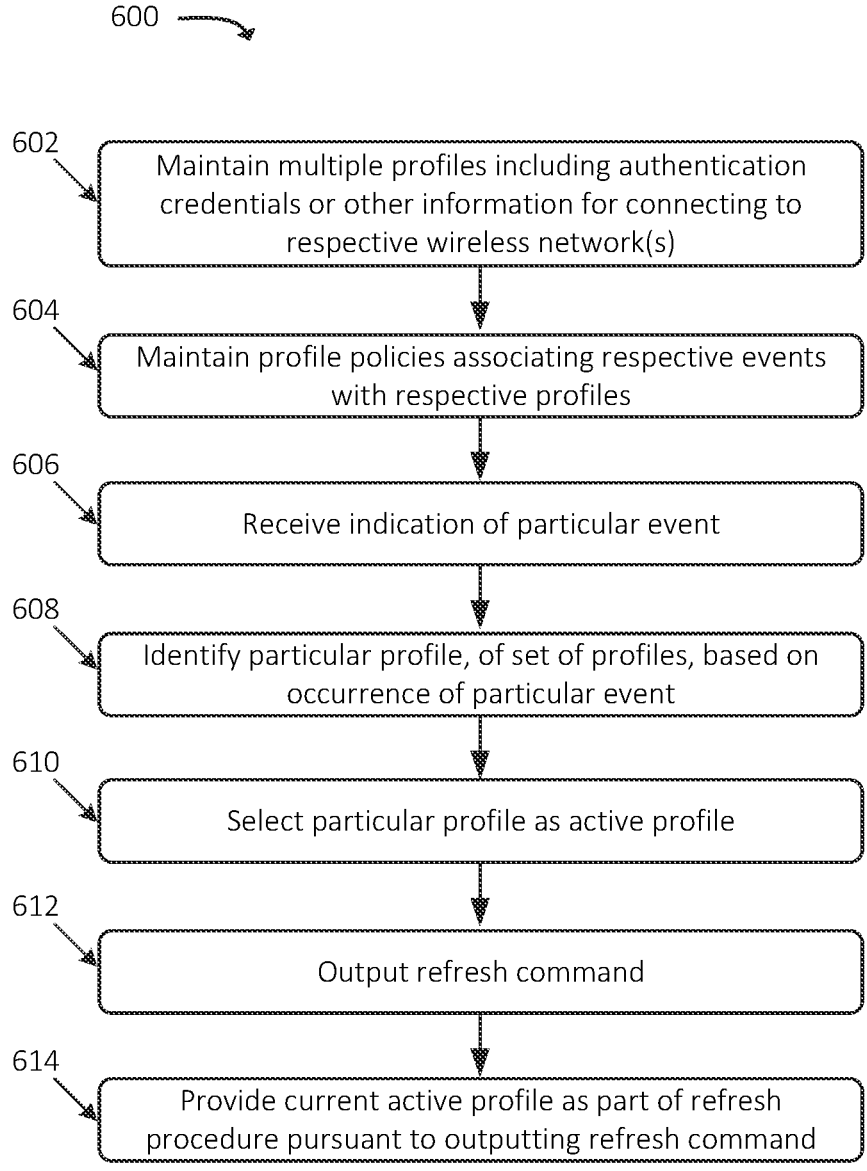

600

602
Maintain multiple profiles including authentication credentials or other information for connecting to respective wireless network(s)

604
Maintain profile policies associating respective events with respective profiles 606
Receive indication of particular event 608
Identify particular profile, of set of profiles, based on occurrence of particular event 610
Select particular profile as active profile 612
Output refresh command 614
Provide current active profile as part of refresh procedure pursuant to outputting refresh command

Output component

1050

Input component

1040

Memory

1030

Bus
1010

Communication
interface

1060

Processor

1020

SYSTEMS AND METHODS FOR POLICY-BASED MULTI-PROFILE SUBSCRIBER IDENTIFICATION MODULE FOR INTERNET OF THINGS DEVICES AND OTHER USER EQUIPMENT

BACKGROUND

Wireless networks provide wireless connectivity to User Equipment ("UEs"), such as mobile telephones, tablets, Internet of Things ("IoT") devices, Machine-to-Machine ("M2M") devices, or the like. Wireless networks may be associated with coverage areas in which UEs may receive wireless connectivity. Different wireless networks may be associated with overlapping or distinct coverage areas. UEs may utilize tamper-resistant secure element devices that contain mechanisms that are used to securely communicate with wireless networks. These mechanisms can be generally referred to as Subscriber Identification/Identity Modules ("SIMs") that can store authentication credentials, as provided by respective wireless network operators, which UEs may use to access corresponding wireless networks. SIMs can vary in implementation format depending on the use case or type of secure element device in which the SIM is deployed—for example, the SIM implementation for GSM ("2G") wireless communications, Universal SIMs ("USIMs") for use in Universal Integrated Circuit Cards ("UICCs") and commonly used in 3G and 4G wireless communications, embedded SIMs ("eSIMs") for use with embedded UICCs ("eUICCs"), and Integrated SIMs ("iSIMs") for use with IoT modems—and each is a type of subscriber identification module that may be used to securely communicate with wireless networks.

BRIEF DESCRIPTION OF THE DRAWINGS

FIG. 6 illustrates an example of multi-profile SIM initiating a profile switch at a UE based on one or more events, in accordance with some embodiments;

DETAILED DESCRIPTION OF EXAMPLE EMBODIMENTS

The following detailed description refers to the accompanying drawings. The same reference numbers in different drawings may identify the same or similar elements. As used herein, the terms "subscriber identification module" and "SIM" will refer to any of various types of subscriber identification modules (e.g., SIMs, USIMs, eSIMs, iSIMs, or the like) that may be deployed with a UE to enable secure communication over a wireless network.

UEs may include one or more SIMs that include and provide authentication credentials that UEs may use to communicate with wireless networks. For example, a particular wireless network provider may provide a SIM for installation at a given UE, may securely communicate with a SIM that is installed at a UE (e.g., via an Over-the-Air ("OTA") update procedure or other secure communication pathway), and/or otherwise configure a SIM to include authentication credentials that may be used by the wireless network operator to authenticate the UE. A set of authentication credentials, to authenticate a UE with a given wireless network, may be included in or otherwise referred to herein as a "profile."

Embodiments described herein provide for a policy-based multi-profile SIM, which may proactively trigger a UE to switch from one profile to another. The UE may, after switching from a first profile to a second profile, use credentials associated with the second profile to obtain wireless connectivity. For example, the UE may connect to a different wireless network using the second profile. As discussed below, the switching may be performed in response to one or more particular events or conditions, such as a loss of wireless connectivity when the first profile is active, the presence of a higher priority or more "preferred" wireless network, or other types of events or conditions. Further, operations described herein may be in accordance with existing standards, protocols, frameworks, application programming interfaces ("APIs"), etc., such as a SIM Toolkit ("STK") standard, a USIM Application Toolkit ("USAT") standard, or the like.

In this manner, existing communication pathways may be leveraged to provide for enhanced robustness and/or management of UE connectivity, without requiring the UE to implement additional protocols or procedures. As such, the policy-based multi-profile SIM of some embodiments may be "plug and play" with any type of UE (or device that integrates or is communicatively coupled to a UE), such as mobile telephones, IoT devices, automated guided vehicles ("AGVs"), autonomous factory robots, etc. As such, the automated profile switching functionality described herein may be performed by a wide variety of UEs with minimal or no additional implementation or configuration operations required by vendors, manufacturers, suppliers, or users of such UEs.

Figure 1:
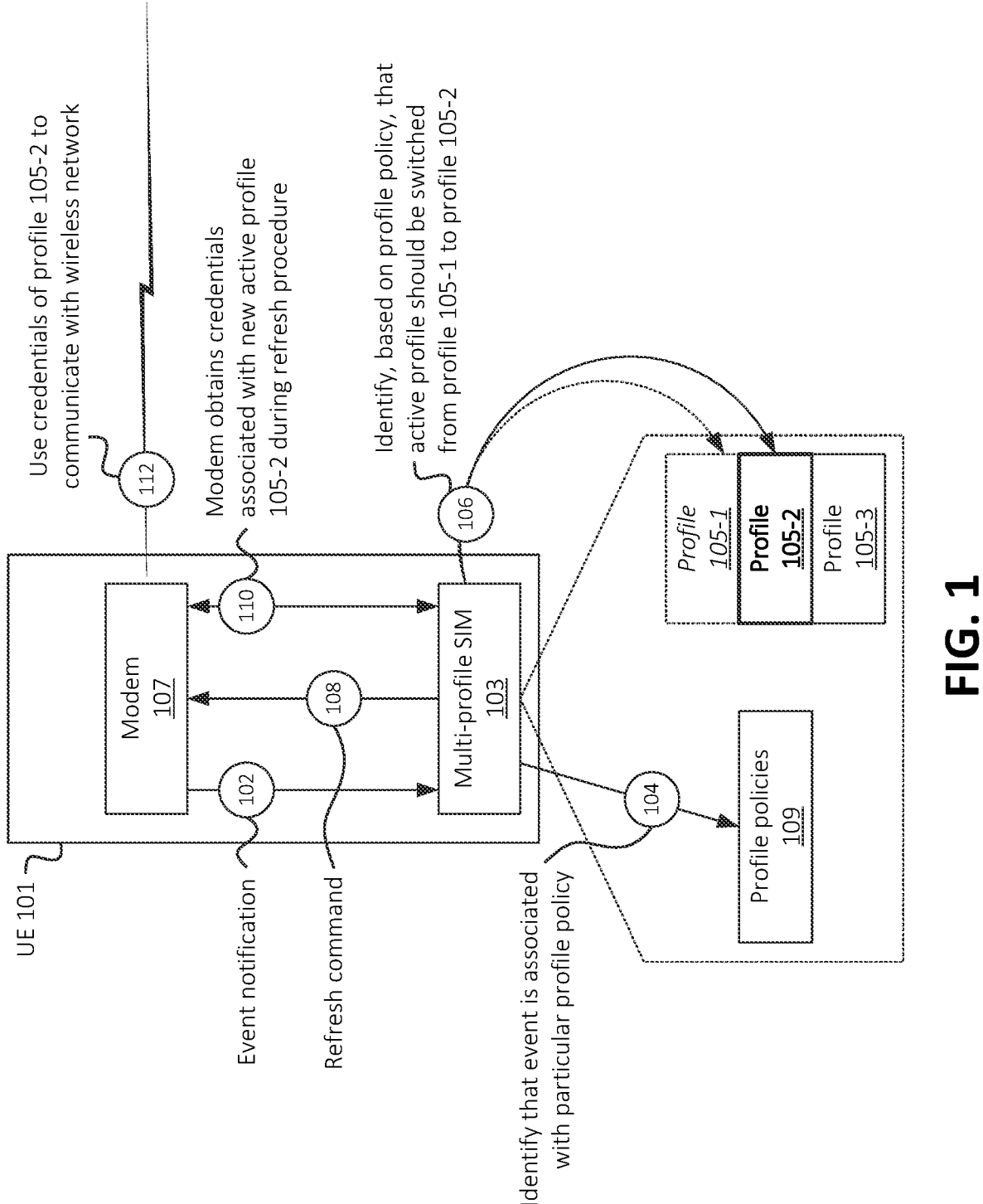
FIG. 1 illustrates an example overview of one or more embodiments described herein.

FIG. 1 illustrates an example UE 101 that includes a multi-profile SIM 103 of some embodiments. As discussed above, multi-profile SIM 103 may be, or may include, an eSIM, a USIM, an iSIM, or the like. In some embodiments, multi-profile SIM 103 may be stored in a secure computing element such as a UICC or eUICC, which may be a part of UE 101 or a device (e.g., a card) that is connected to UE 101. In accordance with embodiments described herein, multi-profile SIM 103 may include multiple profiles 105, such as example profiles 105-1, 105-2, and 105-3. As discussed above, each profile 105 may include authentication credentials, network identifiers (e.g., Public Land Mobile Network ("PLMN") identifiers or other suitable identifiers), Mobile Directory Numbers ("MDNs"), or other suitable information that may facilitate connectivity between UE 101 and one or more wireless networks.

In some embodiments, profile 105-1 may be associated with a first wireless network (e.g., may be used to authenticate UE 101 for access to the first wireless network), profile 105-2 may be associated with a second wireless network, and profile 105-3 may be associated with a third wireless network. In some embodiments, two different profiles 105 may be associated with the same wireless network, but with differing authentication credentials, MDNs, etc. For example, profile 105-1 may be associated with a first MDN that UE 101 may use when accessing a particular wireless network, and profile 105-2 may be associated with a different second MDN that UE 101 may use when accessing the same particular wireless network.

Profiles 105 may have been received from one or more wireless network operators or other suitable sources. As discussed above, profiles 105 may be installed at multi-profile SIM 103 prior to installing multi-profile SIM 103 in UE 101, such as by a vendor of multi-profile SIM 103, a particular wireless network operator (e.g., a wireless network operator associated with a particular profile 105 installed at multi-profile SIM 103), etc. Additionally, or alternatively, profiles 105 may be installed at multi-profile SIM 103 as part of a secure update process while multi-profile SIM 103 is installed at UE 101, such as via an OTA update procedure with a device or system that maintains authentication information or otherwise participates in a secure mechanism with multi-profile SIM 103 by which multi-profile SIM 103 is able to determine that such device or system is authorized to update the information stored on multi-profile SIM 103. Multi-profile SIM 103 may be secure or "sandboxed" (e.g., within a UICC or eUICC), such that the contents stored therein and/or the operations performed thereby may not be able to be changed by an application, operating system, or user of UE 101 (e.g., by a device, system, application, user, etc. that is not authorized to modify the information stored on multi-profile SIM 103).

In some embodiments, multi-profile SIM 103 may include circuitry, logic, etc. to implement one or more operations described herein, in which multi-profile SIM 103 is able to determine triggers or conditions based on which an active first profile 105 for UE 101 should be switched to a second profile 105, and further based on which UE 101 should be notified (e.g., by multi-profile SIM 103) to implement the second profile (e.g., use credentials included in the second profile to communicate with one or more wireless networks). As discussed above, multi-profile SIM 103 may implement one or more standards, APIs, etc. via which multi-profile SIM 103 may communicate with one or more elements of UE 101, such as modem 107. For example, UE 101 (e.g., modem 107) and multi-profile SIM 103 may implement the STK standard, the USAT standard, and/or other suitable communication pathways.

Modem 107 may include, or may be communicatively coupled to, circuitry such as radios, antennas, etc. via which UE 101 may receive wireless connectivity from one or more wireless networks, such as a Fifth Generation ("5G") network, a Long-Term Evolution ("LTE") network, etc. During the course of operation, modem 107 may have access to information regarding the connectivity of UE 101 to one or more wireless networks, such as information indicating the occurrence of particular events. Such events may include UE 101 being powered up (e.g., turned on), UE 101 being placed into or out of an airplane mode, UE 101 connecting to a particular wireless network, UE 101 disconnecting from (or being disconnected from) a particular wireless network, the detection of one or more wireless networks (e.g., detecting wireless system broadcasts from one or more wireless networks that indicate the presence or availability of such wireless networks), or other suitable events.

In this example, assume that profile 105-1 is an active profile. Profile 105-1 may be "active" inasmuch as UE 101

(e.g., modem 107) uses credentials associated with profile 105-1 to communicate with a particular wireless network associated with profile 105-1. UE 101 (e.g., modem 107) may have accessed multi-profile SIM 103 upon startup or at some other suitable time to obtain profile 105-1 (e.g., the credentials included in profile 105-1).

Modem 107 may output (at 102) an event notification to multi-profile SIM 103. The event may be one of the events mentioned above, and/or some other type of event that has been detected by modem 107 in the course of operation of UE 101. In some embodiments, the notification may be a "push" notification provided to multi-profile SIM 103 (e.g., without a specific request from multi-profile SIM 103 for the event notification). Additionally, or alternatively, the notification may be a response to a request from multi-profile SIM 103 (e.g., a "pull" notification) for information regarding any events pertaining to UE 101, as detected by modem 107. Multi-profile SIM 103 may, for example, periodically (e.g., multiple times per second) poll modem 107 for information regarding any events that have occurred, and modem 107 may respond (at 102) with the notification indicating the occurrence of the particular event.

Multi-profile SIM 103 may also maintain a set of profile policies 109, which may include conditions, criteria, etc. based on which multi-profile SIM 103 may potentially identify that an active profile 105 should be switched. Detailed examples of some potential profile policies 109 are discussed below. Profile policies 109 may, for example, be installed at or provided to multi-profile SIM 103 prior to installation or implementation of multi-profile SIM 103 at UE 101. Additionally, or alternatively, one or more profile policies 109 may be dynamically updated or provided to multi-profile SIM 103 after multi-profile SIM 103 has been installed or implemented at UE 101. For example, one or more wireless network operators, administrators, or other suitable entities may provide or update profile policies 109 via a secure messaging interface with multi-profile SIM 103 (e.g., via an OTA update procedure or other suitable procedure). In this manner, the behavior of multi-profile SIM 103 (e.g., the selection of particular profiles 105 and proactively causing UE 101 to implement a selected profile 105) may be modified in a dynamic manner.

In this example, assume that multi-profile SIM 103 identifies (at 104) that the event is associated with a particular profile policy 109. For example, the particular profile policy 109 may include conditions, criteria, etc. specifying a type of event, a time of the event, a location at which the event occurred, or other suitable conditions, which are met by the event indicated in the event notification. In some embodiments, the particular profile policy 109 may further indicate that the particular profile policy 109 is applicable when a particular profile 105 is active (e.g., profile 105-1). For example, the occurrence of a set of conditions, when one profile 105 is active, may be associated with the particular profile policy 109 while the occurrence of the same set of conditions, when another profile 105 is active, may not be associated with the same particular profile policy 109.

Multi-profile SIM 103 may identify (at 106), based on the identified profile policy 109, that the active profile should be switched from profile 105-1 to profile 105-2. For example, the particular profile policy 109 may be applicable in a situation where UE 101 should use a different set of credentials to connect to a wireless network, such as when UE 101 moves from one geographical area (e.g., a coverage area of a first wireless network) to another (e.g., a coverage area of a second wireless network), when UE 101 loses connectivity with a wireless network (e.g., the second profile 105-2 may be a "backup profile" for a different wireless network), and/or in other suitable situations. In some embodiments, profile policy 109 may specify that profile 105-2 should be selected (e.g., in lieu of profile 105-3). Additionally, or alternatively, profile policy 109 may include conditions or criteria that are satisfied by profile 105-2, or profile 105-2 may otherwise be selected over profile 105-3 based on information included in profile policy 109.

Multi-profile SIM 103 may, after switching the active profile from profile 105-1 to profile 105-2, cause UE 101 to use the newly selected active profile 105-2 in lieu of profile 105-1. In accordance with some embodiments, multi-profile SIM 103 may leverage existing standards or procedures in a manner that ultimately causes UE 101 to automatically (e.g., without user intervention) use profile 105-2 to obtain wireless connectivity. In this manner, UE 101 may quickly and automatically receive wireless connectivity from a second network in situations where UE 101 has lost connectivity with a first network.

Similarly, in some embodiments, UE 101 may quickly and automatically receive wireless connectivity from a particular wireless network using a second profile (e.g., a second MDN, a second set of credentials, etc.) when losing connectivity from the wireless network using a first profile (e.g., a first MDN, a first set of credentials, etc.). Such situations may occur when the wireless network is overloaded or otherwise disconnects the UE when the UE is using the first profile. The second profile may, for example, be a "high priority" profile, a "first responder" profile, a "mission critical" profile, etc. that is recognized by the wireless network, and for which access is granted even when other types of profiles are denied access. For example, in high traffic situations or other scenarios, the wireless network may deny access to some or all UEs that are not associated with high priority, first responder, mission critical, etc. profiles (e.g., where particular MDNs or other identifiers included in profiles may be associated with particular categories or types).

In some embodiments, causing UE 101 to switch profiles may include outputting one or more messages according to the STK standard, the USAT standard, or other suitable standards implemented by UE 101 and multi-profile SIM 103. In some embodiments, outputting the one or more messages may include outputting (at 108), by multi-profile SIM 103, a refresh command to one or more other elements of UE 101 (e.g., modem 107). The refresh command may indicate, to UE 101 (e.g., modem 107), that UE 101 should re-obtain profile information from multi-profile SIM 103. In some embodiments, the one or more messages output by multi-profile SIM 103 (at 108) may include some other type of message (e.g., a message in accordance with one or more standards or protocols implemented by UE 101) that indicates that UE 101 (e.g., modem 107) should re-obtain profile information from multi-profile SIM 103.

In some embodiments, multi-profile SIM 103 may initiate a timer or implement some other suitable mechanism after receiving (at 102) an event notification. Such timer or other suitable mechanism may be used to prevent "ping ponging" between different profiles 105, such as in scenarios where UE 101 briefly loses and regains connectivity to a particular wireless network. In some embodiments, different profile policies 109 may specify different durations of such timers or other mechanisms. In some embodiments, different profile policies 109 may include different timers, and/or the timers may be configurable or able to be dynamically updated via a secure messaging interface with multi-profile SIM 103 (e.g., via an OTA update procedure or other suitable procedure).

UE 101 (e.g., modem 107) may accordingly initiate or participate in (at 110) a refresh procedure based on receiving (at 108) the refresh command. As discussed above, the refresh procedure may include modem 107 receiving active profile information from multi-profile SIM 103. Since multi-profile SIM 103 has switched (at 106) the active profile from profile 105-1 to profile 105-2, multi-profile SIM 103 may provide (at 110) credentials or other information associated with profile 105-2 as part of the refresh procedure. In this sense, modem 107 may now use an MDN, authentication credentials, PLMN identifier, etc. associated with profile 105-2 when communicating (at 112) with a wireless network. For example, profile 105-2 may search for a wireless network that has a matching PLMN identifier, may use the authentication credentials and/or MDN of profile 105-2 when requesting a connection with the wireless network, and so on. In this manner, the profile used by UE 101 may be automatically switched based on the occurrence of a suitable triggering event, without the need for a specific request from a user or application of UE 101. Such implements may be useful in environments where IoT devices are deployed, such as smart circuit breakers, sensors, or other types of devices that may not be readily accessible to users, maintenance crews, operators, etc.

Figure 2:
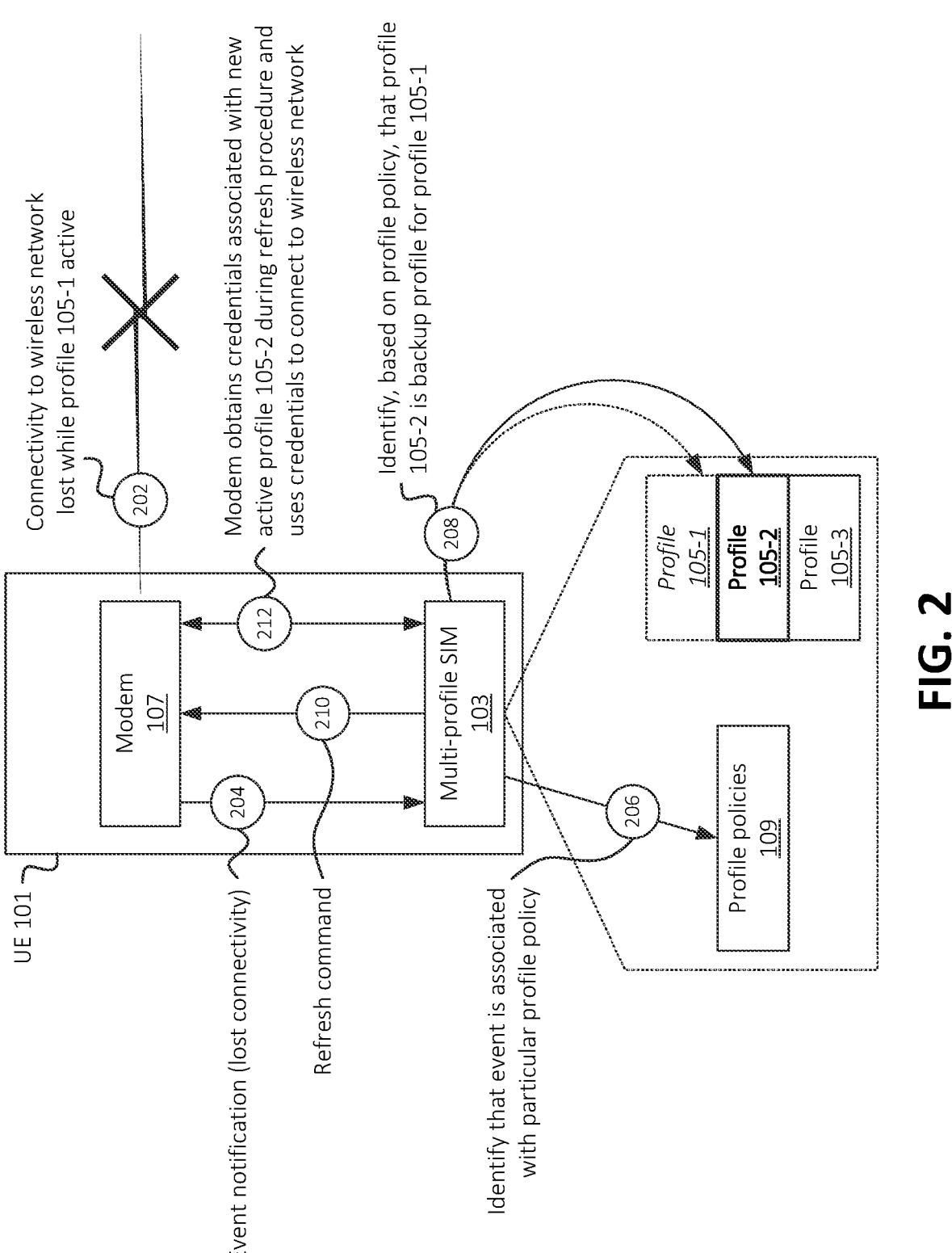
FIGS. 2-4 illustrate examples of a multi-profile SIM initiating a profile switch at a UE based on the UE losing connectivity with a wireless network, in accordance with some embodiments.

FIG. 2 provides an example of the above operations in a situation where connectivity has been lost to a wireless network while UE 101 has a particular profile 105-1 as an active profile. As shown, UE 101 (e.g., modem 107) may detect (at 202) that connectivity has been lost to a wireless network while profile 105-1 is active. For example, UE 101 may identify that no wireless signals (e.g., system broadcast messages or other signals) are detected from the wireless network, may identify that UE 101 has been disconnected by the wireless network (e.g., one or more active radio bearers have been de-established), that a performance of communications between UE 101 and the wireless network has fallen below a threshold measure of performance (e.g., latency above a threshold, throughput below a threshold, etc.), and/or that UE 101 has otherwise lost connectivity to the wireless network.

Modem 107 may accordingly notify (at 204) multi-profile SIM 103 (e.g., using one or more messages associated with an STK standard, a USAT standard, or other suitable standard or protocol) that UE 101 has lost wireless connectivity. Multi-profile SIM 103 may identify (at 206) that the lost connectivity event is associated with a particular profile policy 109 (e.g., a particular profile policy 109 that is applicable when UE 101 has lost connectivity, and/or when profile 105-1 is the active profile). Multi-profile SIM 103 may identify (at 208), based on the identified profile policy 109, that profile 105-2 is a backup profile for profile 105-1, in case of a lost connectivity event. For example, multi-profile SIM 103 may select profile 105-2 as an active profile in lieu of one or more other profiles 105 (e.g., profile 105-3) based on the identified profile policy 109.

Multi-profile SIM 103 may, without user intervention and without a command from an application executing at UE 101, cause UE 101 to use the backup profile 105-2 in lieu of profile 105-1. For example, as discussed above, multi-profile SIM 103 may output (at 210) a refresh command, based on which modem 107 may obtain (at 212) the current active profile (i.e., profile 105-2, in this example) from multi-profile SIM 103. As similarly discussed above, UE 101 may use the newly obtained active profile 105-2 (e.g., which may include an MDN, authentication credentials, a PLMN iden-
tifier, and/or other suitable information) to obtain connec-
tivity from a wireless network, which may be a different
wireless network from the wireless network to which UE
101 lost (at 202) connectivity.

Figure 3:
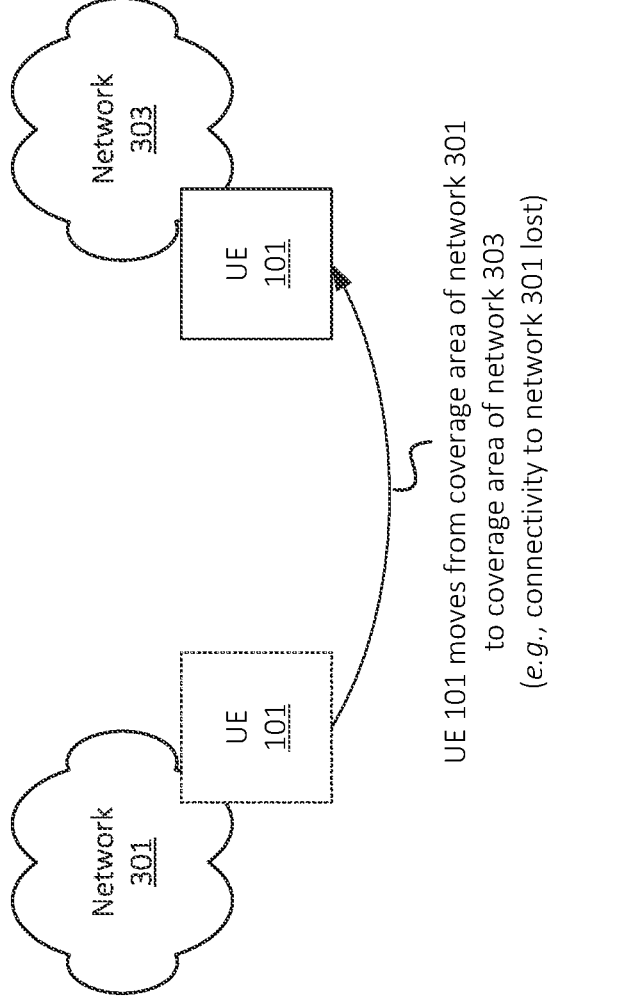
Figure 4:
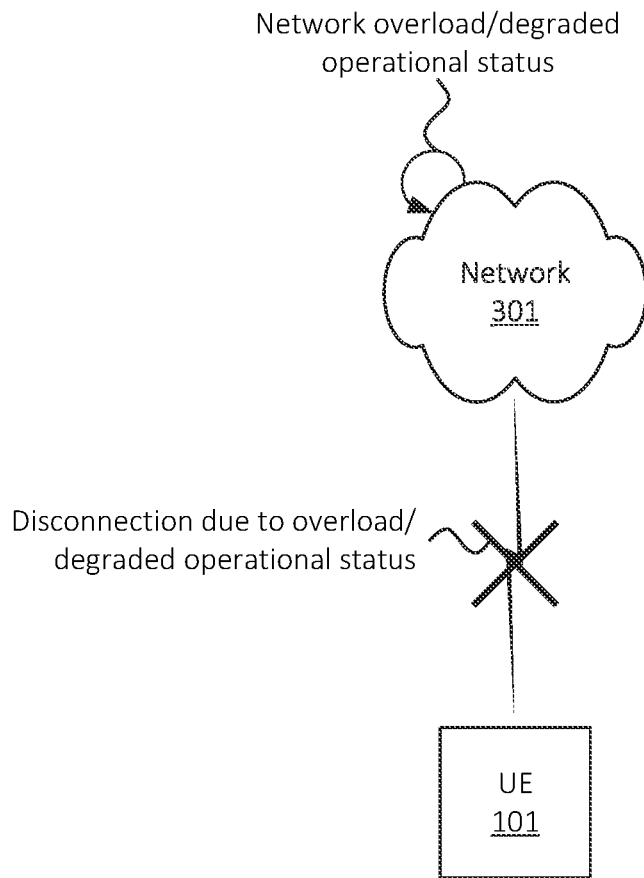

FIGS. 3 and 4 further illustrate example scenarios in
which UE 101 may lose connectivity to a wireless network.
For example, as shown in FIG. 3, UE 101 may move away
from a coverage area associated with a first wireless network
301. When moving away from the coverage area associated
with the first wireless network 301, UE 101 may move into
a coverage area associated with a second wireless network
303. As similarly discussed above, multi-profile SIM 103 of
UE 101 may be notified of a lost connectivity event, and may
select backup profile 105-2. Profile 105-2 may include
authentication credentials that are usable by UE 101 to
connect to wireless network 303, may include an MDN
provisioned by a provisioning system of wireless network
303, may include a PLMN identifier of wireless network
303, and/or other information that UE 101 may use to
connect to wireless network 303.

In some embodiments, UE 101 (e.g., modem 107) may
notify multi-profile SIM 103 that wireless network 303 has
been detected (e.g., in conjunction with, or at some other
time) when notifying multi-profile SIM 103 that connectiv-
ity to wireless network 301 has been lost. In such embodi-
ments, a particular profile policy 109 may specify that
profile 105-2, which includes authentication credentials or
other suitable information usable to connect to wireless
network 303, should be selected as an active profile. That is,
in some embodiments, multi-profile SIM 103 may select an
active profile based on wireless networks that have been
detected by UE 101.

As shown in FIG. 4, UE 101 may lose connectivity to
wireless network 301 in situations where wireless network
301 is overloaded or is otherwise experiencing a degraded
operational status. Wireless network 301 may accordingly
disconnect UE 101 (e.g., may de-establish one or more radio
bearers, may cease accepting uplink traffic, may cease
transmitting downlink traffic, etc.) based on the overload
and/or degraded operational status conditions. Additionally,
or alternatively, UE 101 may de facto identify a disconnec-
tion from wireless network 301 based on not receiving traffic
or traffic grants (e.g., allocations of radio resources) from
wireless network 301, based on degraded performance or
signal metrics (e.g., throughput, latency, Signal-to-Interfer-
ence-and-Noise-Ratio ("SINR"), Reference Signal Received
Power ("RSRP"), etc.).

As discussed above, multi-profile SIM 103 may receive a
notification of the disconnection from wireless network 301,
and may select a different profile 105 based on receiving
such notification. The different profile 105 may be used to
attempt to connect to a different wireless network, and/or to
re-attempt to connect to wireless network 301 with a dif-
ferent MDN or authentication credentials.

Figure 5:
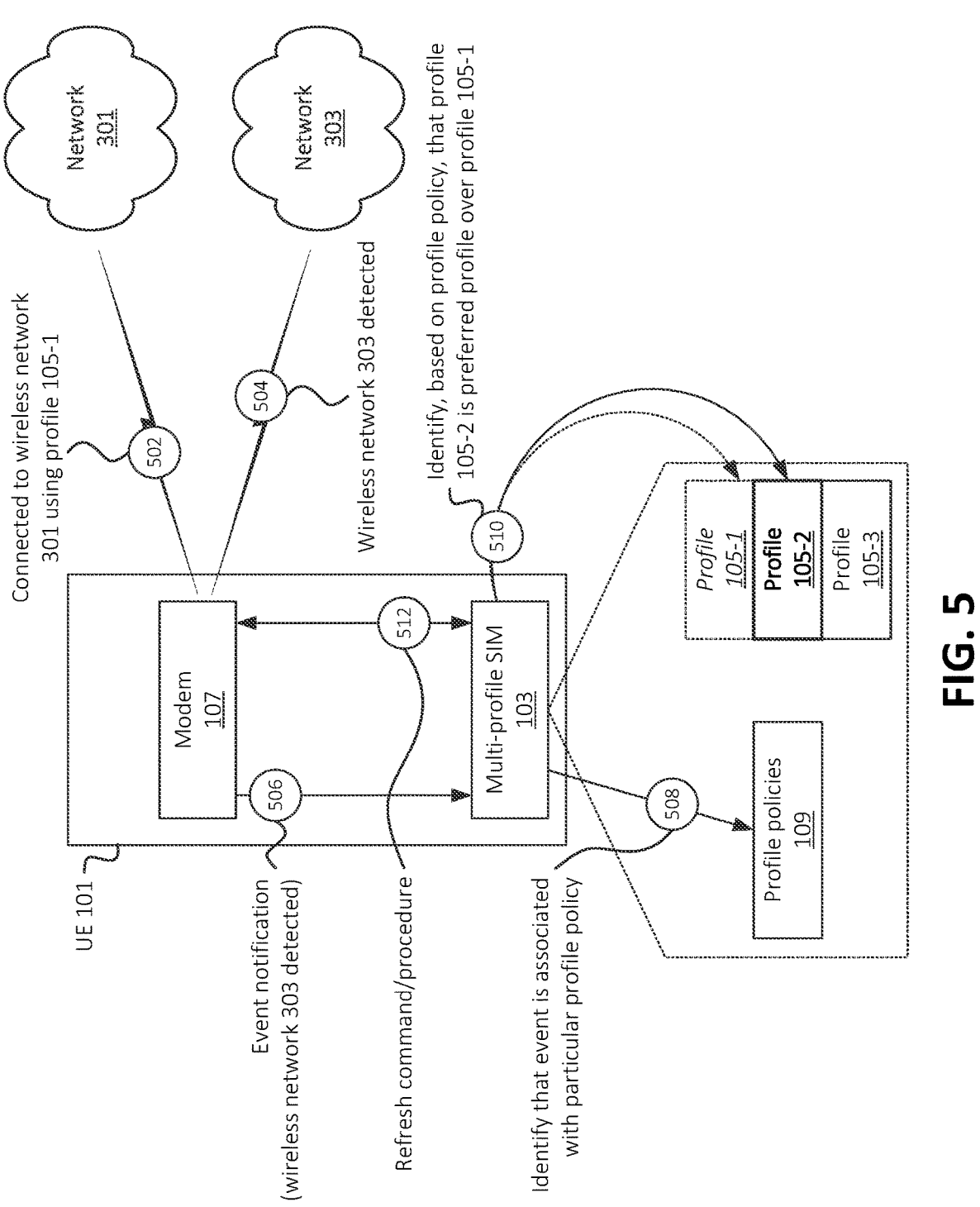
FIG. 5 illustrates an example of a multi-profile SIM initiating a profile switch at a UE based on identifying availability of a preferred wireless network, in accordance with some embodiments.

As shown in FIG. 5, different wireless networks may be
assigned different levels of priority, and multi-profile SIM
103 may switch profiles 105 in accordance with the priority
levels of wireless networks of which UE 101 is in range. In
the example of FIG. 5, assume that UE 101 is connected (at
502) to a first wireless network 301, and that UE 101 uses
a first profile 105-1 (e.g., authentication credentials, a par-
ticular MDN, etc.) to connect to wireless network 301. As
further shown, while UE 101 is connected to wireless
network 301, UE 101 may detect (at 504) a second wireless
network 303. For example, UE 101 may be within a cov-
erage area of wireless network 301 while also being within a coverage area of wireless network 303 (e.g., the coverage
areas of wireless networks 301 and 303) may partially or
entirely overlap with each other. UE 101 may, for example,
detect system broadcasts or other wireless signals from
wireless network 303 (e.g., as transmitted by a RAN of
wireless network 303).

UE 101 (e.g., modem 107) may output (at 506) an event
notification to multi-profile SIM 103, where the event noti-
fication includes an indication that wireless network 303 has
been detected. The notification may include a PLMN iden-
tifier or other identifier of wireless network 303 (e.g., where
such information may be included or otherwise determined
from system broadcasts or other wireless signals transmitted
by wireless network 303). Multi-profile SIM 103 may iden-
tify (at 508) that the indicated event is associated with a
particular profile policy 109, such as a particular profile
policy 109 that includes the identifier of wireless network
303. Additionally, or alternatively, the particular profile
policy 109 may include an indication that wireless network
303 is a preferred network or higher a higher priority
network than wireless network 301, and/or that a particular
profile 105 (e.g., profile 105-2) that is associated with
wireless network 303 is a higher priority profile than the
currently active profile 105-1.

Multi-profile SIM 103 may accordingly select (at 510)
profile 105-2 as the new active profile, and may initiate (at
512) a refresh procedure or other suitable procedure
whereby modem 107 obtains the newly selected active
profile 105-2. As similarly discussed above, UE 101 (e.g.,
modem 107) may use the newly selected profile 105-2 to
communicate with wireless network 303. For example,
modem 107 may identify that profile 105-2 is associated
with the same PLMN identifier as wireless network 303, and
may request a connection to wireless network 303 in lieu of
requesting a connection to wireless network 301. That is,
since profile 105-2 is associated with wireless network 303,
UE 101 may select wireless network 303 as the wireless
network to which UE 101 requests wireless connectivity, in
lieu of selecting wireless network 301 which is no longer
associated with the active profile.

In some embodiments, one or more profile policies 109
may include "switch back" parameters or timers, in which an
active profile may be reverted to a previous or "default"
profile after a particular quantity of attempts to connect to a
particular wireless network (e.g., a backup wireless network
using a backup profile 105), or after a certain amount of
time. Additionally, or alternatively, multi-profile SIM 103
may otherwise be configured to automatically switch to a
different active profile 105 after initiating a switch of active
profiles 105.

For example, referring to the example of FIG. 5, multi-
profile SIM 103 may initiate a two-hour timer after switch-
ing to profile 105-2, after which multi-profile SIM 103
automatically switches back to profile 105-1. Switching
back to profile 105-1 may include similar operations dis-
cussed above, such as a refresh command issued to modem
107, based on which modem 107 obtains authentication
credentials or other information included in profile 105-1
(e.g., switching from profile 105-2 to profile 105-1).

As another example, if UE 101 is unable to obtain
wireless connectivity after switching active profiles 105,
multi-profile SIM 103 may be configured to switch back to
a previous active profile 105. For example, again referring to
FIG. 5, assume that UE 101 is unable to obtain wireless
connectivity (e.g., is unable to connect to wireless network
303) after switching to profile 105-2. Multi-profile SIM 103
may receive an event notification (e.g., a "push" notification from modem 107, or may "pull" such information based on polling modem 107 or otherwise requesting such information) indicating that UE 101 has not connected to wireless network 303. Multi-profile SIM 103 may, in such a situation, revert the selection of the active profile to profile 105-1, and may issue a refresh command to modem 107 to cause modem 107 to re-obtain the credentials associated with profile 105-1. In some embodiments, the quantity of attempts or the duration of time spent attempting to obtain connectivity using a switched profile 105, before switching back to a previous or "default" profile 105, may be configurable or dynamically updated via a secure messaging pathway with multi-profile SIM 103, such as via an OTA update procedure or other suitable procedure.

In some embodiments, when a connection to a given wireless network (e.g., wireless network 303) is unsuccessful after a profile switch, multi-profile SIM 103 may be configured to "cool off" on selecting the same profile 105 for some time. For example, if multi-profile SIM 103 selects profile 105-2 and subsequently receives a notification (or otherwise determines) that UE 101 was unable to use profile 105-2 to obtain wireless connectivity, then multi-profile SIM 103 may refrain from again selecting profile 105-2 for a particular duration of time (e.g., one day, two days, etc.). In some embodiments, such durations of time may be configurable or dynamically updated via a secure messaging pathway with multi-profile SIM 103, such as via an OTA update procedure or other suitable procedure.

FIG. 6 illustrates an example process 600 for a particular multi-profile SIM 103 initiating a profile switch at a particular UE 101 based on one or more events. In some embodiments, some or all of process 600 may be performed by multi-profile SIM 103. As discussed above, multi-profile SIM 103 may be a device that is implemented by a separate physical card that may be installed in or removed from UE 101, may be implemented by an embedded set of hardware of UE 101, and/or may otherwise be implemented by discrete physical components of UE 101 (e.g., that are separate from other modules or components of UE 101, such as modem 107 or other circuitry that is used by UE 101 to wirelessly communicate with one or more wireless networks). In this manner, multi-profile SIM 103 may be "plug and play" or a "black box" with respect to UE 101, such that multi-profile SIM 103 may be developed, configured, provided, etc. by a separate entity (e.g., manufacturer, vendor, operator, etc.) from an entity that provides or configures UE 101 itself.

As shown, process 600 may include maintaining (at 602) multiple profiles 105, which include authentication credentials or other information (e.g., MDNs, PLMN identifiers, etc.) that may be used by UE 101 to communicate with one or more wireless networks. For example, multi-profile SIM 103 may be initially configured or provisioned with such information prior to installation or implementation at UE 101, and/or one or more of the profiles 105 may be provided to or updated at multi-profile SIM 103 after multi-profile SIM 103 has been installed, implemented, etc. at UE 101 (e.g., via a secure OTA update procedure or other suitable procedure).

Process 600 may further include maintaining (at 604) a set of profile policies 109 that are associated with respective events with particular profiles 105. For example, multi-profile SIM 103 may be initially configured or provisioned with such information prior to installation or implementation at UE 101, and/or one or more of the profile policies 109 may be provided to or updated at multi-profile SIM 103 after multi-profile SIM 103 has been installed, implemented, etc.

at UE 101 (e.g., via a secure OTA update procedure or other suitable procedure). Profile policies 109 may, for example, include types of events or other suitable types of conditions or criteria, as well as an indication of which particular profile 105 should be selected as an active profile when such conditions or criteria are met.

Process 600 may additionally include receiving (at 606) an indication of the occurrence of a particular event. For example, multi-profile SIM 103 may communicate with one or more other modules, components, circuitry, etc. of UE 101 (e.g., a wireless communication component of UE 101 such as modem 107) via the STK standard, the USAT standard, or other suitable standard, API, protocol, etc. to receive such indications. As discussed above, multi-profile SIM 103 may periodically (e.g., multiple times per second, once per minute, and/or at some other interval) poll modem 107 for event information, or modem 107 may "push" event information to multi-profile SIM 103. Modem 107 may, for example, detect the occurrence of such events during the course of operation of UE 101, where such events may include the detection of a given wireless network, the connection of UE 101 to a given wireless network, the disconnection of UE 101 from a given wireless network, the loss of wireless connectivity for UE 101, or other suitable types of events.

Process 600 may also include identifying (at 608) a particular profile 105, of the maintained set of profiles 105, based on the occurrence of the particular event. For example, multi-profile SIM 103 may identify a particular profile policy 109 that is applicable to the particular event, and may identify a particular profile 105 that is indicated in the particular profile policy 109. Process 600 may further include selecting (at 610) the particular profile 105 as an active profile.

Process 600 may additionally include outputting (at 612) a refresh command, such as to modem 107 or other suitable modules, components, or circuitry of UE 101. For example, as discussed above, the refresh command may be used to indicate, to UE 101, that profile information should be re-obtained from multi-profile SIM 103. In some embodiments, multi-profile SIM 103 may cause UE 101 to re-obtain the active profile information from multi-profile SIM 103 via some other mechanism, in addition to or in lieu of outputting the refresh command.

Process 600 may also include providing (at 614) the current active profile (i.e., the particular profile 105 that has been selected at 610) as part of a refresh procedure. Such refresh procedure may be performed pursuant to issuing (at 612) the refresh command. For example, modem 107 may request, from multi-profile SIM 103, active profile information. Since the active profile has been switched (at 610), the profile information (provided at 614) may be a different profile 105 than was previously used by modem 107 to obtain wireless connectivity. UE 101 (e.g., modem 107) may proceed to use authentication credentials or other suitable information of the switched profile 105 to obtain wireless connectivity. As discussed above, using the switched profile 105 may allow UE 101 to access a backup wireless network when connectivity to a primary wireless network has been lost, may allow UE 101 to use a "preferred" or higher priority network, etc. Since the operations discussed above are able to be performed by multi-profile SIM 103 in accordance with some embodiments, other elements of UE 101 need not be modified or configured to specifically provide for such functionality.

Figure 7:
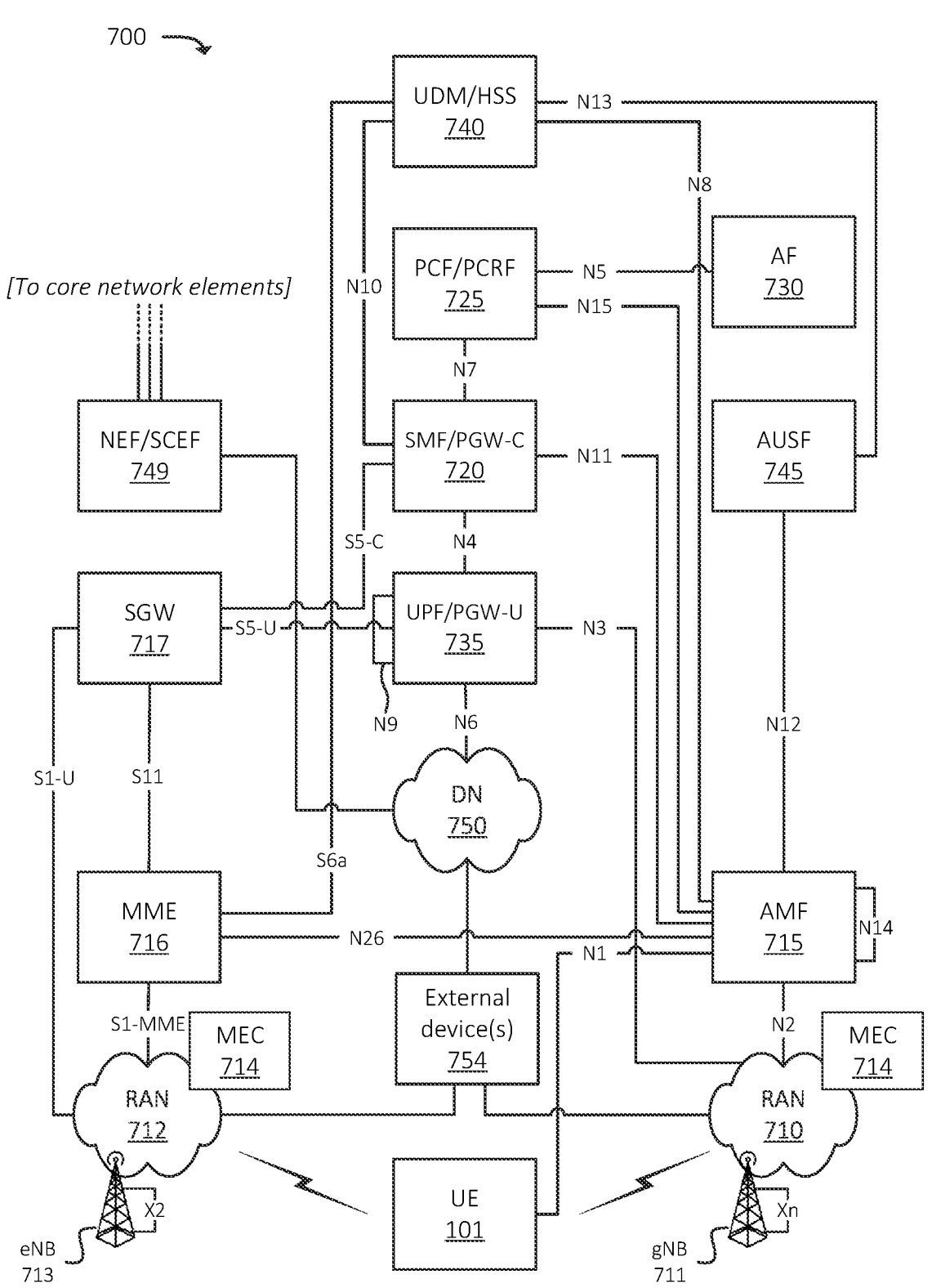
FIGS. 7 and 8 illustrate example environments in which one or more embodiments, described herein, may be implemented.

FIG. 7 illustrates an example environment 700, in which one or more embodiments may be implemented. In some embodiments, environment 700 may correspond to a 5G network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., an LTE RAT), and/or in which elements of a 5G core network may be implemented by, may be communicatively coupled with, and/or may include elements of another type of core network (e.g., an evolved packet core ("EPC")). In some embodiments, portions of environment 700 may represent or may include a 5G core ("5GC"). As shown, environment 700 may include UE 101, RAN 710 (which may include one or more Next Generation Node Bs ("gNBs") 711), RAN 712 (which may include one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Unified Data Management ("UDM")/Home Subscriber Server ("HSS") 740, Authentication Server Function ("AUSF") 745, and Network Exposure Function ("NEF")/Service Capability Exposure Function ("SCEF") 749. Environment 700 may also include one or more networks, such as Data Network ("DN") 750. Environment 700 may include one or more additional devices or systems communicatively coupled to one or more networks (e.g., DN 750), such as one or more external devices 754.

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of AMF 715, SMF/PGW-C 720, PCF/PCRF 725, and/or UPF/PGW-U 735, while another slice may include a second instance of AMF 715, SMF/PGW-C 720, PCF/PCRF 725, and/or UPF/PGW-U 735). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. In some implementations, one or more devices of environment 700 may be physically integrated in, and/or may be physically attached to, one or more other devices of environment 700. Alternatively, or additionally, one or more of the devices of environment 700 may perform one or more network functions described as being performed by another one or more of the devices of environment 700.

Additionally, one or more elements of environment 700 may be implemented in a virtualized and/or containerized manner. For example, one or more of the elements of environment 700 may be implemented by one or more Virtualized Network Functions ("VNFs"), Cloud-Native Network Functions ("CNFs"), etc. In such embodiments, environment 700 may include, may implement, and/or may be communicatively coupled to an orchestration platform that provisions hardware resources, installs containers or applications, performs load balancing, and/or otherwise manages the deployment of such elements of environment 700. In some embodiments, such orchestration and/or management of such elements of environment 700 may be performed by, or in conjunction with, the open-source Kubernetes® application programming interface ("API") or some other suitable virtualization, containerization, and/or orchestration system.

Elements of environment 700 may interconnect with each other and/or other devices via wired connections, wireless connections, or a combination of wired and wireless connections. Examples of interfaces or communication pathways between the elements of environment 700, as shown in FIG. 7, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 7, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 700 may be, may include, may be implemented by, and/or may be communicatively coupled to wireless networks 301 and/or 303.

UE 101 may include a computation and communication device, such as a wireless mobile communication device that is capable of communicating with RAN 710, RAN 712, and/or DN 750. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), a Fixed Wireless Access ("FWA") device, or another type of mobile computation and communication device. UE 101 may send traffic to and/or receive traffic (e.g., user plane traffic) from DN 750 via RAN 710, RAN 712, and/or UPF/PGW-U 735.

RAN 710 may be, or may include, a 5G RAN that implements a 5G RAT and that includes one or more base stations (e.g., one or more gNBs 711), via which UE 101 may communicate with one or more other elements of environment 700. UE 101 may communicate with RAN 710 via an air interface (e.g., as provided by gNB 711). For instance, RAN 710 may receive traffic (e.g., user plane traffic such as voice call traffic, data traffic, messaging traffic, etc.) from UE 101 via the air interface, and may communicate the traffic to UPF/PGW-U 735 and/or one or more other devices or networks. Further, RAN 710 may receive signaling traffic, control plane traffic, etc. from UE 101 via the air interface, and may communicate such signaling traffic, control plane traffic, etc. to AMF 715 and/or one or more other devices or networks. Additionally, RAN 710 may receive traffic intended for UE 101 (e.g., from UPF/PGW-U 735, AMF 715, and/or one or more other devices or networks) and may communicate the traffic to UE 101 via the air interface.

RAN 712 may be, or may include, an LTE RAN that implements an LTE RAT and that includes one or more base stations (e.g., one or more eNBs 713), via which UE 101 may communicate with one or more other elements of environment 700. UE 101 may communicate with RAN 712 via an air interface (e.g., as provided by eNB 713). For instance, RAN 712 may receive traffic (e.g., user plane traffic such as voice call traffic, data traffic, messaging traffic, signaling traffic, etc.) from UE 101 via the air interface, and may communicate the traffic to UPF/PGW-U 735 (e.g., via SGW 717) and/or one or more other devices or networks. Further, RAN 712 may receive signaling traffic, control plane traffic, etc. from UE 101 via the air interface, and may communicate such signaling traffic, control plane traffic, etc. to MME 716 and/or one or more other devices or networks. Additionally, RAN 712 may receive traffic intended for UE 101 (e.g., from UPF/PGW-U 735, MME 716, SGW 717, and/or one or more other devices or networks) and may communicate the traffic to UE 101 via the air interface.

One or more RANs of environment 700 (e.g., RAN 710 and/or RAN 712) may include, may implement, and/or may otherwise be communicatively coupled to one or more edge computing devices, such as one or more Multi-Access/ Mobile Edge Computing ("MEC") devices (referred to sometimes herein simply as a "MECs") 714. MECs 714 may be co-located with wireless network infrastructure equipment of RANs 710 and/or 712 (e.g., one or more gNBs 711 and/or one or more eNBs 713, respectively). Additionally, or alternatively, MECs 714 may otherwise be associated with geographical regions (e.g., coverage areas) of wireless network infrastructure equipment of RANs 710 and/or 712. In some embodiments, one or more MECs 714 may be implemented by the same set of hardware resources, the same set of devices, etc. that implement wireless network infrastructure equipment of RANs 710 and/or 712. In some embodiments, one or more MECs 714 may be implemented by different hardware resources, a different set of devices, etc. from hardware resources or devices that implement wireless network infrastructure equipment of RANs 710 and/or 712. In some embodiments, MECs 714 may be communicatively coupled to wireless network infrastructure equipment of RANs 710 and/or 712 (e.g., via a high-speed and/or low-latency link such as a physical wired interface, a high-speed and/or low-latency wireless interface, or some other suitable communication pathway).

MECs 714 may include hardware resources (e.g., configurable or provisionable hardware resources) that may be configured to provide services and/or otherwise process traffic to and/or from UE 101, via RAN 710 and/or 712. For example, RAN 710 and/or 712 may route some traffic from UE 101 (e.g., traffic associated with one or more particular services, applications, application types, etc.) to a respective MEC 714 instead of to core network elements of 700 (e.g., UPF/PGW-U 735). MEC 714 may accordingly provide services to UE 101 by processing such traffic, performing one or more computations based on the received traffic, and providing traffic to UE 101 via RAN 710 and/or 712. MEC 714 may include, and/or may implement, some or all of the functionality described above with respect to UPF/PGW-U 735, AF 730, one or more application servers, and/or one or more other devices, systems, VNFs, CNFs, etc. In this manner, ultra-low latency services may be provided to UE 101, as traffic does not need to traverse links (e.g., backhaul links) between RAN 710 and/or 712 and the core network.

AMF 715 may include one or more devices, systems, VNFs, CNFs, etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 101. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 101, from DN 750, and may forward the user plane data toward UE 101 (e.g., via RAN 710, SMF/PGW-C 720, and/or one or more other devices). In some embodiments, multiple instances of UPF/PGW-U 735 may be deployed (e.g., in different geographical locations), and the delivery of content to UE 101 may be coordinated via the N9 interface (e.g., as denoted in FIG. 7 by the line marked "N9" originating and terminating at UPF/PGW-U 735). Similarly, UPF/PGW-U 735 may receive traffic from UE 101 (e.g., via RAN 710, RAN 712, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. In some embodiments, UDM/HSS 740 may include, may implement, may be communicatively coupled to, and/or may otherwise be associated with some other type of repository or database, such as a Unified Data Repository ("UDR"). AUSF 745 and/or UDM/HSS 740 may perform authentication, authorization, and/or accounting operations associated with one or more UEs 101 and/or one or more communication sessions associated with one or more UEs 101.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 101 may communicate, through DN 750, with data servers, other UEs 101, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 101 may communicate.

External devices 754 may include one or more devices or systems that communicate with UE 101 via DN 750 and one or more elements of 700 (e.g., via UPF/PGW-U 735). External devices 754 may include, for example, one or more application servers, content provider systems, web servers, or the like. External devices 754 may, for example, implement "server-side" applications that communicate with "client-side" applications executed by UE 101. External devices 754 may provide services to UE 101 such as gaming services, videoconferencing services, messaging services, email services, web services, and/or other types of services.

In some embodiments, external devices 754 may communicate with one or more elements of environment 700 (e.g., core network elements) via NEF/SCEF 749. NEF/SCEF 749 include one or more devices, systems, VNFs, CNFs, etc. that provide access to information, APIs, and/or other operations or mechanisms of one or more core network elements to devices or systems that are external to the core network (e.g., to external device 754 via DN 750). NEF/SCEF 749 may maintain authorization and/or authentication information associated with such external devices or systems, such that NEF/SCEF 749 is able to provide information, that is authorized to be provided, to the external devices or systems. For example, a given external device 754 may request particular information associated with one or more core network elements. NEF/SCEF 749 may authenticate the request and/or otherwise verify that external device 754 is authorized to receive the information, and may request, obtain, or otherwise receive the information from the one or more core network elements. In some embodiments, NEF/SCEF 749 may include, may implement, may be implemented by, may be communicatively coupled to, and/or may otherwise be associated with a Security Edge Protection Proxy ("SEPP"), which may perform some or all of the functions discussed above. External device 754 may, in some situations, subscribe to particular types of requested information provided by the one or more core network elements, and the one or more core network elements may provide (e.g., "push") the requested information to NEF/SCEF 749 (e.g., in a periodic or otherwise ongoing basis).

In some embodiments, external devices 754 may communicate with one or more elements of RAN 710 and/or 712 via an API or other suitable interface. For example, a given external device 754 may provide instructions, requests, etc. to RAN 710 and/or 712 to provide one or more services via one or more respective MECs 714. In some embodiments, such instructions, requests, etc. may include QoS parameters, Service Level Agreements ("SLAs"), etc. (e.g., maximum latency thresholds, minimum throughput thresholds, etc.) associated with the services.

Figure 8:
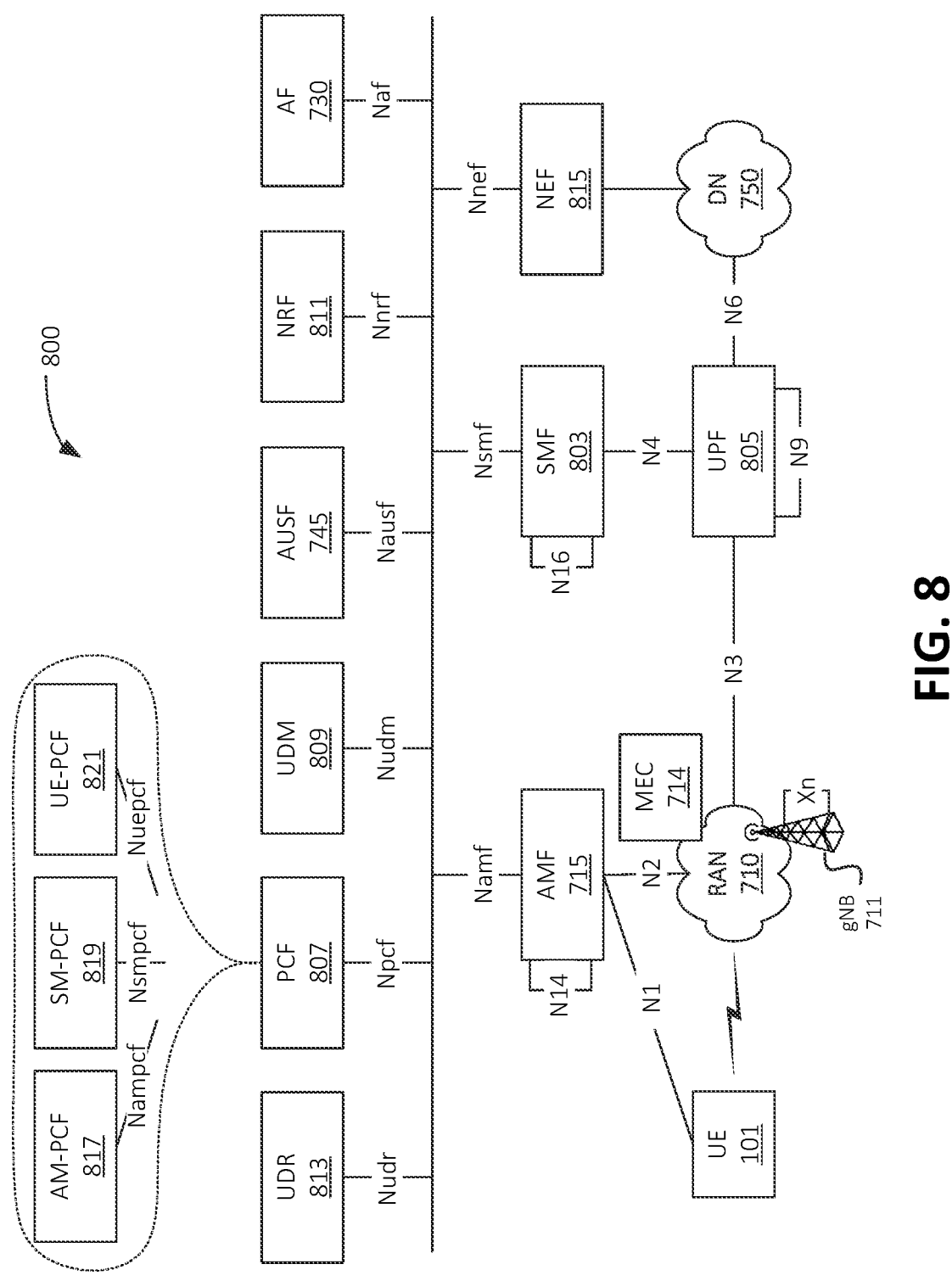

FIG. 8 illustrates another example environment 800, in which one or more embodiments may be implemented. In some embodiments, environment 800 may correspond to a 5G network, and/or may include elements of a 5G network. In some embodiments, environment 800 may correspond to a 5G SA architecture. In some embodiments, environment 800 may include a 5GC, in which 5GC network elements perform one or more operations described herein.

As shown, environment 800 may include UE 101, RAN 710 (which may include one or more gNBs 711 or other types of wireless network infrastructure) and various network functions, which may be implemented as VNFs, CNFs, etc. Such network functions may include AMF 715, SMF 803, UPF 805, PCF 807, UDM 809, AUSF 745, Network Repository Function ("NRF") 811, AF 730, UDR 813, and NEF 815. Environment 800 may also include or may be communicatively coupled to one or more networks, such as DN 750.

The example shown in FIG. 8 illustrates one instance of each network component or function (e.g., one instance of SMF 803, UPF 805, PCF 807, UDM 809, AUSF 745, etc.). In practice, environment 800 may include multiple instances of such components or functions. For example, in some embodiments, environment 800 may include multiple "slices" of a core network, where each slice includes a discrete and/or logical set of network functions (e.g., one slice may include a first instance of SMF 803, PCF 807, UPF 805, etc., while another slice may include a second instance of SMF 803, PCF 807, UPF 805, etc.). Additionally, or alternatively, one or more of the network functions of environment 800 may implement multiple network slices. The different slices may provide differentiated levels of service, such as service in accordance with different QoS parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800.

Elements of environment 800 may interconnect with each other and/or other devices via wired connections, wireless connections, or a combination of wired and wireless connections. Examples of interfaces or communication pathways between the elements of environment 800, as shown in FIG. 8, may include interfaces shown in FIG. 8 and/or one or more interfaces not explicitly shown in FIG. 8. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 800 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 715), an Nudm interface (e.g., indicating communications to be routed to UDM 809), an Npcf interface, an Nupf interface, an Nnef interface, an Nsmf interface, an Nnrf interface, an Nudr interface, an Naf interface, and/or one or more other SBIs. In some embodiments, environment 800 may be, may include, may be implemented by, and/or may be communicatively coupled to wireless networks 301 and/or 303.

UPF 805 may include one or more devices, systems, VNFs, CNFs, etc., that receive, route, process, and/or forward traffic (e.g., user plane traffic). As discussed above, UPF 805 may communicate with UE 101 via one or more communication sessions, such as PDU sessions. Such PDU sessions may be associated with a particular network slice or other suitable QoS parameters, as noted above. UPF 805 may receive downlink user plane traffic (e.g., voice call traffic, data traffic, etc. destined for UE 101) from DN 750, and may forward the downlink user plane traffic toward UE 101 (e.g., via RAN 710). In some embodiments, multiple UPFs 805 may be deployed (e.g., in different geographical locations), and the delivery of content to UE 101 may be coordinated via the N9 interface. Similarly, UPF 805 may receive uplink traffic from UE 101 (e.g., via RAN 710), and may forward the traffic toward DN 750. In some embodiments, UPF 805 may implement, may be implemented by, may be communicatively coupled to, and/or may otherwise be associated with UPF/PGW-U 735. In some embodiments, UPF 805 may communicate (e.g., via the N4 interface) with SMF 803, regarding user plane data processed by UPF 805 (e.g., to provide analytics or reporting information, to receive policy and/or authorization information, etc.).

PCF 807 may include one or more devices, systems, VNFs, CNFs, etc., that aggregate, derive, generate, etc. policy information associated with the 5GC and/or UEs 101 that communicate via the 5GC and/or RAN 710. PCF 807 may receive information regarding policies and/or subscriptions from one or more sources, such as subscriber databases (e.g., UDM 809, UDR 813, etc.), and/or from one or more users such as, for example, an administrator associated with PCF 807. In some embodiments, the functionality of PCF 807 may be split into multiple network functions or subsystems, such as access and mobility PCF ("AM-PCF") 817, session management PCF ("SM-PCF") 819, UE PCF ("UE-PCF") 821, and so on. Such different "split" PCFs may be associated with respective SBIs (e.g., AM-PCF 817 may be associated with an Nampcf SBI, SM-PCF 819 may be associated with an Nsmpcf SBI, UE-PCF 821 may be associated with an Nuepcf SBI, and so on) via which other network functions may communicate with the split PCFs.

The split PCFs may maintain information regarding policies associated with different devices, systems, and/or network functions.

NRF 811 may include one or more devices, systems, VNFs, CNFs, etc. that maintain routing and/or network topology information associated with the 5GC. For example, NRF 811 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 813 may include one or more devices, systems, VNFs, CNFs, etc. that provide user and/or subscriber information, based on which PCF 807 and/or other elements of environment 800 may determine access policies, QoS policies, charging policies, or the like. In some embodiments, UDR 813 may receive such information from UDM 809 and/or one or more other sources.

NEF 815 include one or more devices, systems, VNFs, CNFs, etc. that provide access to information, APIs, and/or other operations or mechanisms of the 5GC to devices or systems that are external to the 5GC. NEF 815 may maintain authorization and/or authentication information associated with such external devices or systems, such that NEF 815 is able to provide information, that is authorized to be provided, to the external devices or systems. Such information may be received from other network functions of the 5GC (e.g., as authorized by an administrator or other suitable entity associated with the 5GC), such as SMF 803, UPF 805, a charging function ("CHF") of the 5GC, and/or other suitable network function. NEF 815 may communicate with external devices or systems (e.g., external devices 754) via DN 750 and/or other suitable communication pathways.

While environment 800 is described in the context of a 5GC, as noted above, environment 800 may, in some embodiments, include or implement one or more other types of core networks. For example, in some embodiments, environment 800 may be or may include a converged packet core, in which one or more elements may perform some or all of the functionality of one or more 5GC network functions and/or one or more EPC network functions. For example, in some embodiments, AMF 715 may include, may implement, may be implemented by, and/or may otherwise be associated with MME 716; SMF 803 may include, may implement, may be implemented by, and/or may otherwise be associated with SGW 717; PCF 807 may include, may implement, may be implemented by, and/or may otherwise be associated with a PCRF (e.g., PCF/PCRF 725); NEF 815 may include, may implement, may be implemented by, and/or may otherwise be associated with a SCEF (e.g., NEF/SCEF 749); and so on.

Figure 9:
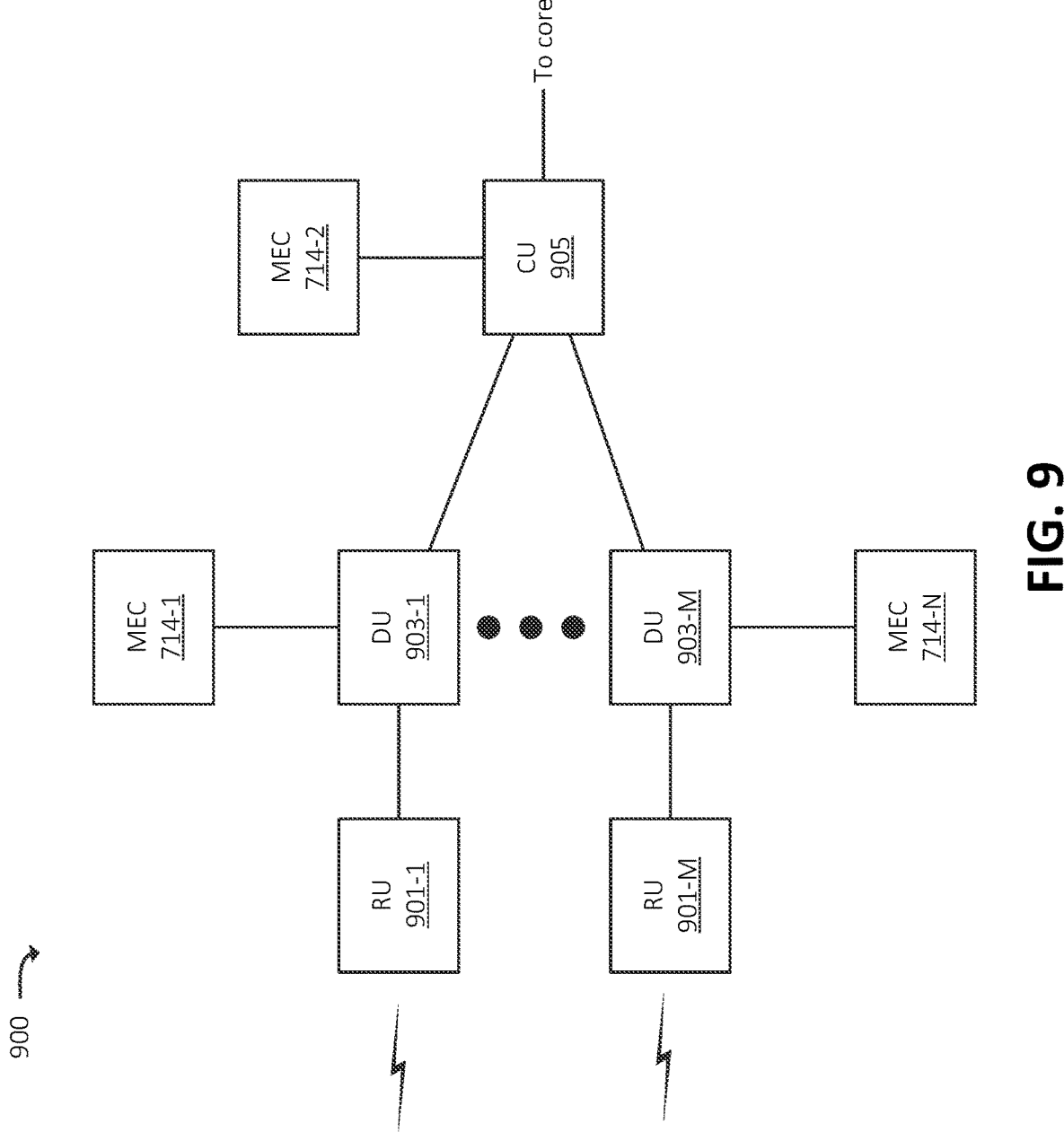
FIG. 9 illustrates an example arrangement of a radio access network ("RAN"), in accordance with some embodiments.

FIG. 9 illustrates an example RAN environment 900, which may be included in and/or implemented by one or more RANs (e.g., RAN 710 or some other RAN). In some embodiments, a particular RAN 710 may include one RAN environment 900. In some embodiments, a particular RAN 710 may include multiple RAN environments 900. In some embodiments, RAN environment 900 may correspond to a particular gNB 711 of RAN 710. In some embodiments, RAN environment 900 may correspond to multiple gNBs 711. In some embodiments, RAN environment 900 may correspond to one or more other types of base stations of one or more other types of RANs. As shown, RAN environment 900 may include Central Unit ("CU") 905, one or more Distributed Units ("DUs") 903-1 through 903-M (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 715 and/or UPF 805) and/or some other device or system such as MEC 714. In the uplink direction (e.g., for traffic from UEs 101 to a core network), CU 905 may aggregate traffic from DUs 903, and forward the aggregated traffic to the core network. In some embodiments, CU 905 may receive traffic according to a given protocol (e.g., Radio Link Control ("RLC") traffic) from DUs 903, and may perform higher-layer processing (e.g., may aggregate/process RLC packets and generate Packet Data Convergence Protocol ("PDCP") packets based on the RLC packets) on the traffic received from DUs 903.

CU 905 may receive downlink traffic (e.g., traffic from the core network, traffic from a given MEC 714, etc.) for a particular UE 101, and may determine which DU(s) 903 should receive the downlink traffic. DU 903 may include one or more devices that transmit traffic between a core network (e.g., via CU 905) and UE 101 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 101.

RU 901 may include hardware circuitry (e.g., one or more RF transceivers, antennas, radios, and/or other suitable hardware) to communicate wirelessly (e.g., via an RF interface) with one or more UEs 101, one or more other DUs 903 (e.g., via RUs 901 associated with DUs 903), and/or any other suitable type of device. In the uplink direction, RU 901 may receive traffic from UE 101 and/or another DU 903 via the RF interface and may provide the traffic to DU 903. In the downlink direction, RU 901 may receive traffic from DU 903, and may provide the traffic to UE 101 and/or another DU 903.

One or more elements of RAN environment 900 may, in some embodiments, be communicatively coupled to one or more MECs 714. For example, DU 903-1 may be communicatively coupled to MEC 714-1, DU 903-M may be communicatively coupled to MEC 714-N, CU 905 may be communicatively coupled to MEC 714-2, and so on. MECs 714 may include hardware resources (e.g., configurable or provisionable hardware resources) that may be configured to provide services and/or otherwise process traffic to and/or from UE 101, via a respective RU 901.

For example, DU 903-1 may route some traffic, from UE 101, to MEC 714-1 instead of to a core network via CU 905. MEC 714-1 may process the traffic, perform one or more computations based on the received traffic, and may provide traffic to UE 101 via RU 901-1. As discussed above, MEC 714 may include, and/or may implement, some or all of the functionality described above with respect to UPF 805, AF 730, and/or one or more other devices, systems, VNFs, CNFs, etc. In this manner, ultra-low latency services may be provided to UE 101, as traffic does not need to traverse DU 903, CU 905, links between DU 903 and CU 905, and an intervening backhaul network between RAN environment 900 and the core network.

Figure 10:
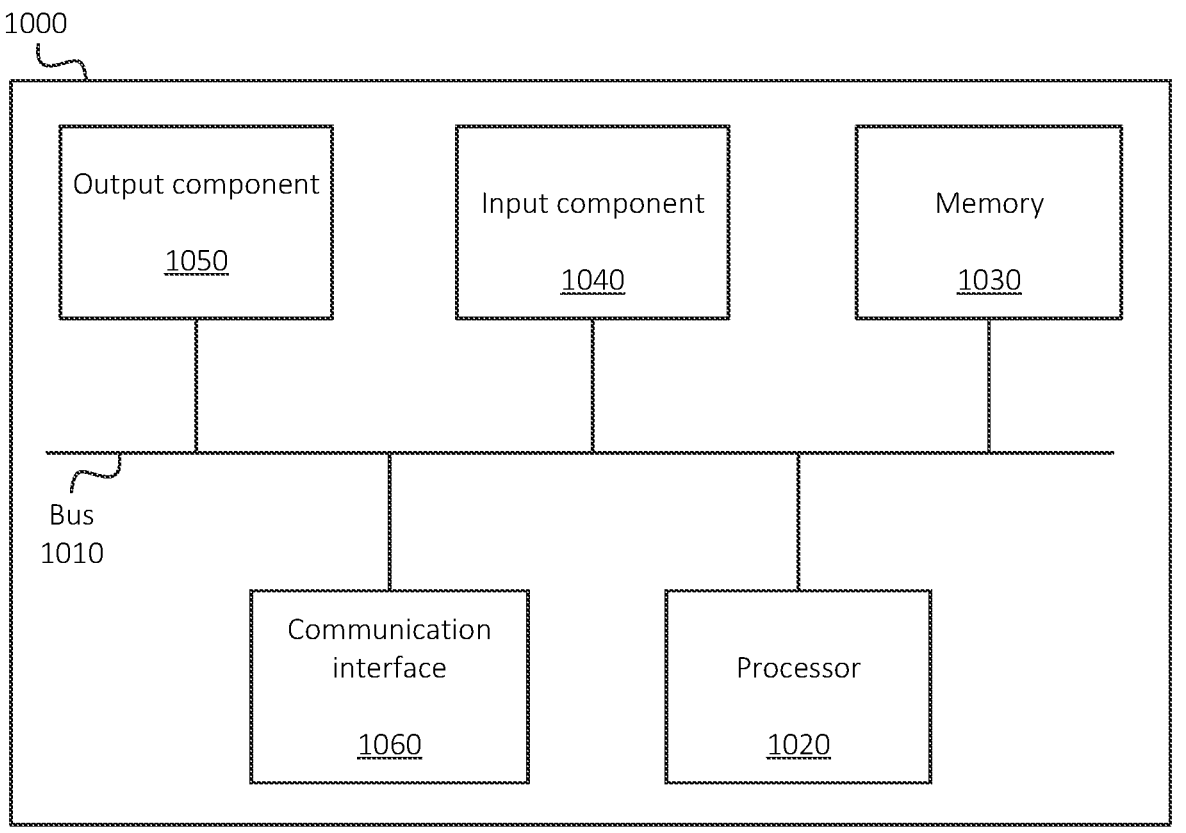
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, a set of provisioned hardware resources of a cloud computing system, or other suitable type of hardware that interprets and/or executes instructions (e.g., processor-executable instructions). In some embodiments, processor 1020 may be or may include one or more hardware processors. Memory 1030 may include any type of dynamic storage device that may store information and instructions for execution by processor 1020, and/or any type of nonvolatile storage device that may store information for use by processor 1020.

Input component 1040 may include a mechanism that permits an operator to input information to device 1000 and/or otherwise receives or detects input from a source external to input component 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems (e.g., via RAN 710, RAN 712, DN 750, etc.). For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1000 may include more than one communication interface 1060. For instance, device 1000 may include an optical interface, a wireless interface, an Ethernet interface, and/or one or more other interfaces.

Device 1000 may perform certain operations relating to one or more processes described above. Device 1000 may perform these operations in response to processor 1020 executing instructions, such as software instructions, processor-executable instructions, etc. stored in a computer-readable medium, such as memory 1030. A computer-readable medium may be defined as a non-transitory memory device. A memory device may include space within a single physical memory device or spread across multiple physical memory devices. The instructions may be read into memory 1030 from another computer-readable medium or from another device. The instructions stored in memory 1030 may be processor-executable instructions that cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
maintain a set of profiles that each include a respective set of authentication credentials for connecting to one or more wireless networks;
maintain a set of policies associating respective events with respective profiles of the set of profiles;
receive an indication of a particular event;
identify, based on the set of policies, that the particular event is associated with a particular profile;
select the particular profile as an active profile;
output a refresh command after selecting the particular profile as the active profile;
receive, based on outputting the refresh command, a request for the active profile; and
output, based on the request for the active profile, the set of authentication credentials associated with the selected particular profile.

2. The device of claim 1, wherein the request for the active profile is received from a modem of a User Equipment ("UE").

3. The device of claim 2, wherein the modem uses the authentication credentials associated with the selected particular profile to connect to a particular wireless network.

4. The device of claim 3, wherein the particular profile includes a network identifier, wherein the particular wireless network is associated with a same network identifier.

5. The device of claim 1, wherein the request for the active profile is received via at least one of:
one or more messages in accordance with a Subscriber Identification Module ("SIM") Toolkit ("STK") standard, or
one or more messages in accordance with a Universal SIM ("USIM") Application Toolkit ("USAT") standard.

6. The device of claim 5, wherein the indication of the particular event is received via at least one of:
one or more messages in accordance with the STK standard, or
one or more messages in accordance with the USAT standard.

7. The device of claim 1, wherein the device includes a Subscriber Identification Module ("SIM") device implemented at a User Equipment ("UE").

8. A method, comprising:
maintaining a set of profiles that each include a respective set of authentication credentials for connecting to one or more wireless networks;

maintaining a set of policies associating respective events with respective profiles of the set of profiles;

receiving an indication of a particular event;

identifying, based on the set of policies, that the particular event is associated with a particular profile;

selecting the particular profile as an active profile;

outputting a refresh command after selecting the particular profile as the active profile;

receiving, based on outputting the refresh command, a request for the active profile; and outputting, based on the request for the active profile, the set of authentication credentials associated with the selected particular profile.

9. The method of claim 8, wherein the request for the active profile is received from a modem of a User Equipment ("UE").

10. The method of claim 9, wherein the modem uses the authentication credentials associated with the selected particular profile to connect to a particular wireless network.

11. The method of claim 10, wherein the particular profile includes a network identifier, wherein the particular wireless network is associated with a same network identifier.

12. The method of claim 8, wherein the request for the active profile is received via at least one of:

one or more messages in accordance with a Subscriber Identification Module ("SIM") Toolkit ("STK") standard, or one or more messages in accordance with a Universal SIM ("USIM") Application Toolkit ("USAT") standard.

13. The method of claim 12, wherein the indication of the particular event is received via at least one of:

one or more messages in accordance with the STK standard, or one or more messages in accordance with the USAT standard.

14. The method of claim 8, wherein the method is performed by a Subscriber Identification Module ("SIM") device implemented at a User Equipment ("UE").

15. A Subscriber Identification Module ("SIM") device, wherein the SIM device is configured to:

maintain a set of profiles that each include a respective set of authentication credentials for connecting to one or more wireless networks;

maintain a set of policies associating respective events with respective profiles of the set of profiles;

receive, from a wireless communication component of a User Equipment ("UE") at which the SIM is implemented, an indication of a particular event;

identify, based on the set of policies, that the particular event is associated with a particular profile;

select the particular profile as an active profile;

output, to the wireless communication component of the UE, a refresh command after selecting the particular profile as the active profile;

receive, from the wireless communication component of the UE and based on outputting the refresh command, a request for the active profile; and output, to the wireless communication component of the UE, the set of authentication credentials associated with the selected particular profile, wherein the wireless communication component of the UE uses the set of authentication credentials to obtain wireless connectivity from a particular wireless network.

16. The SIM device of claim 15, wherein the wireless communication component of the UE includes a modem.

17. The SIM device of claim 15, wherein the particular profile includes a network identifier, wherein the particular wireless network is associated with a same network identifier.

18. The SIM device of claim 15, wherein the request for the active profile is received via at least one of:

one or more messages in accordance with a Subscriber Identification Module ("SIM") Toolkit ("STK") standard, or one or more messages in accordance with a Universal SIM ("USIM") Application Toolkit ("USAT") standard.

19. The SIM device of claim 18, wherein the indication of the particular event is received via at least one of:

one or more messages in accordance with the STK standard, or one or more messages in accordance with the USAT standard.

20. The SIM device of claim 15, wherein the set of profiles or the set of policies are received via an Over-the-Air ("OTA") update procedure.

* * * * *